United States Patent
Mollier

(10) Patent No.: US 9,732,805 B2
(45) Date of Patent: Aug. 15, 2017

(54) CLUTCH, IN PARTICULAR FOR A MOTOR VEHICLE

(71) Applicant: VALEO EMRAYAGES, Amiens (FR)

(72) Inventor: Christophe Mollier, Herblay (FR)

(73) Assignee: Valeo Embrayages (FR)

( * ) Notice: Subject to any disclaimer, the term of this patent is extended or adjusted under 35 U.S.C. 154(b) by 205 days.

(21) Appl. No.: 14/535,841

(22) Filed: Nov. 7, 2014

(65) Prior Publication Data

US 2015/0136561 A1 May 21, 2015

(30) Foreign Application Priority Data

Nov. 15, 2013 (FR) ...................... 13 61172

(51) Int. Cl.
*F16D 23/14* (2006.01)
*F16D 21/06* (2006.01)
*F16D 25/08* (2006.01)

(52) U.S. Cl.
CPC ........... *F16D 23/143* (2013.01); *F16D 21/06* (2013.01); *F16D 25/08* (2013.01); *F16D 25/083* (2013.01); *F16D 2021/0669* (2013.01); *F16D 2300/18* (2013.01)

(58) Field of Classification Search
CPC ...... F16D 23/147; F16D 23/143; F16D 21/06; F16D 25/08; F16D 25/087; F16D 2021/0669; F16D 2300/18; G01B 2210/54; G01D 5/12
See application file for complete search history.

(56) References Cited

U.S. PATENT DOCUMENTS

| | | | | |
|---|---|---|---|---|
| 6,883,658 B2 * | 4/2005 | Reul | ..................... | F16D 25/083 |
| | | | | 192/30 W |
| 8,222,895 B2 * | 7/2012 | Asahara | ................. | G01B 7/046 |
| | | | | 324/207.11 |
| 2001/0052444 A1* | 12/2001 | Drexl | .................... | F16D 25/082 |
| | | | | 192/85.51 |
| 2011/0139571 A1* | 6/2011 | Acker | ..................... | F16D 21/06 |
| | | | | 192/85.01 |
| 2012/0146625 A1 | 6/2012 | Grommer | | |

FOREIGN PATENT DOCUMENTS

| | | |
|---|---|---|
| DE | 102009035911 | 2/2010 |
| DE | 102009056380 | 6/2010 |
| EP | 1898111 | 3/2008 |
| EP | 2128456 | 12/2009 |
| EP | 2410192 | 1/2012 |
| FR | 2829815 | 3/2003 |

\* cited by examiner

*Primary Examiner* — Stacey Fluhart
(74) *Attorney, Agent, or Firm* — Berenato & White, LLC

(57) ABSTRACT

A clutch release bearing (17), in particular for a motor vehicle, having: a tubular body (30) through which at least one input shaft (11) of a gearbox is intended to pass; at least one actuator having a part, movable in translation along the axis (X) of the body (30), intended for actuation of a clutch diaphragm; a target (28*a*, 28*b*) whose position is representative of the position of the movable part of the actuator; and a detector (29*a*, 29*b*) capable of detecting the position of the target (28*a*, 28*b*). The target (28*a*, 28*b*) is offset angularly from the detector (29*a*, 29*b*) with respect to the axis (X) of the body (30).

15 Claims, 4 Drawing Sheets

CLUTCH, IN PARTICULAR FOR A MOTOR VEHICLE

CROSS-REFERENCE TO RELATED APPLICATIONS AND CLAIM TO PRIORITY

This application claims priority to Patent Application No. 1361172 filed Nov. 15, 2013 in France, the disclosure of which is incorporated herein by reference and to which priority is claimed.

FIELD OF THE INVENTION

The present invention relates to a clutch release bearing, in particular for a motor vehicle.

BACKGROUND OF THE INVENTION

A clutch conventionally comprises a reaction plate, a movable pressure plate, and a friction disk mounted between said reaction and pressure plates. Movement of the pressure plate is controlled by a diaphragm, which is turn controlled by a release bearing. The friction disk is rotationally linked to an input shaft of a gearbox, and the reaction plate is, for example, rotationally integral with a flywheel linked to the driving shaft, for example a crankshaft of an internal combustion engine.

The release bearing is controlled by an actuator regulated by an electronic calculator so as to exert a predetermined force on the diaphragm and displace it a given distance.

The pressure plate is thus movable between an engaged position in which the friction disk is clamped between said pressure plate and reaction plate, and a disengaged position in which the friction disk is released.

It is known to use a release bearing having a tubular body through which the input shaft of the gearbox is intended to pass, an actuator having a tubular movable part, also called a "piston," engaged in an annular receptacle of the body and movable in translation parallel to the axis of the body. The piston of the actuator is intended to operate a clutch diaphragm, for example by way of a ball bearing. The piston is thus movable between an engaged position in which a driving torque is transmitted to the input shaft of the gearbox, and a disengaged position in which no torque is transmitted to said shaft.

A bearing of this kind thus comprises an actuator of the concentric slave cylinder (CSC) type.

As is known from the document FR 2 985 555 in the name of the Applicant, and from the document EP 1 898 111, the release bearing can be equipped with a target whose position is representative of the position of the movable part of the actuator, and with a detector capable of detecting the position of the target. In the case of the two aforementioned documents, the detector is arranged radially outside of the target and the body, resulting in a significant radial space requirement.

The documents DE 10 2009 056 380 and US 2012/0146625 disclose release bearings allowing the operation of double clutches.

As is known, a double clutch in particular allows the driving shaft of the vehicle to be coupled alternatively to two coaxial input shafts of a gearbox, which latter can be automated.

A double clutch thus allows the gear ratio to be changed while maintaining the transmission of a driving torque to the wheels of the vehicle. This is because the two clutches are associated respectively with even- and odd-numbered gear ratios. During a gear ratio change, a first clutch is disengaged while the second clutch is engaged, so that driving torque is transferred progressively from the first to the second clutch.

Each clutch comprises a mechanism having a diaphragm intended to interact with a pressure plate that is rotationally integral with the engine's shaft. Each diaphragm is displaceable by means of a corresponding release bearing between an inactive position and an active position. Depending on the type of clutch, the active position of the diaphragm corresponds to a coupling or decoupling of the engine and gearbox shafts, and the inactive position of the diaphragm corresponds to a decoupling or coupling of said shafts. The terms used are thus a "normally open" and a "normally closed" clutch.

For safety reasons, at least one of the clutches is of the normally open type.

The release bearing is controlled by an actuator regulated by an electronic calculator so as to exert a predetermined force on the diaphragm and displace it a given distance.

The pressure plate of each clutch, impinged upon by the corresponding diaphragm, is intended to clamp a friction disk against a corresponding reaction plate. A reaction plate can be provided for each clutch. As a variant, a single reaction plate that is common to both clutches is used, mounted between the two friction disks.

Each friction disk is rotationally linked to an input shaft of the gearbox, and each reaction plate is, for example, rotationally integral with a flywheel linked to the driving shaft. Clamping a friction disk between the corresponding pressure plate and reaction plate thus allows a torque to be transmitted between the driving shaft and the associated gearbox shaft.

In case of a double clutch, the associated release bearing conventionally has two actuators, specifically a first actuator whose piston allows displacement of the diaphragm of the first clutch, and a second actuator whose piston allows displacement of the diaphragm of the second clutch. The two pistons are coaxial and extend into coaxial annular chambers of the body of the release bearing.

In the document DE 10 2009 056 380, each piston is equipped with a target intended to interact with a radially external detector. The target that is part of the radially inner piston passes through an opening of the body as well as the radially external piston, so that said target is located facing toward the aforesaid detector. A structure of this kind requires an increase in the axial dimension, and thus the space requirement, of the release bearing. In addition, given the proximity of the two targets, undesired interference can exist between the targets and/or the associated detectors, which is detrimental to efficiency and to measurement precision.

In the document US 2012/0146625, the target and the detector associated with the first piston operate on a different detection principle from the target and detector associated with the second piston, in order to avoid any interaction between the targets and detectors located close to one another. A first detector can be, for example, of the magnetic type, the other detector then being non-magnetic. This prevents the use of two detectors of the same kind, for example two Hall-effect, PLCD, or inductance detectors, which are inexpensive detectors that are reliable even in environments subjected to vibration and to large temperature swings.

SUMMARY OF THE INVENTION

The object of the invention is in particular to provide a simple, effective, and economical solution to the aforesaid problems.

It proposes for this purpose a clutch release bearing, in particular for a motor vehicle, having: a tubular body through which at least one input shaft of a gearbox is intended to pass; at least one actuator having a part, movable in translation along the axis of the body, intended for actuation of a clutch diaphragm; a target whose position is representative of the position of the movable part of the actuator; and a detector capable of detecting the position of the target, wherein the target is offset angularly from the detector with respect to the axis of the body.

The angular offset between the target and the detector allows the radial space requirement of the release bearing to be reduced. The target and the detector constitute a noncontact sensor.

The target is preferably located, at least in part, radially facing toward the detector or on the same circumference as the detector.

In the case in which the release bearing serves for operation of a double clutch, said bearing can have a first actuator and a second actuator located radially inside of the first actuator, each actuator having a movable part, a target whose position is representative of the position of the movable part of the actuator, and an associated detector capable of detecting the position of said target, at least one of said targets being offset angularly with respect to the associated detector and being located, at least in part, radially facing toward said associated detector or on the same circumference as said associated detector.

It is thereby possible to limit the radial and axial space requirement of the release bearing while avoiding possible undesired interactions between the various targets and detectors, in order to ensure precise measurement.

According to an embodiment of the invention, the detectors of the first and second actuators are offset angularly from one another with respect to the axis of the tubular body.

According to another embodiment of the invention, the detectors of the first and second actuators are located in a single radial plane, the associated targets of the first and second actuators being offset angularly from one another with respect to the axis of the tubular body.

Advantageously, the magnetic field of each target is directed toward the associated detector. In particular, in the case where several detectors are used, the magnetic field of each target is directed exclusively toward the associated detector and not toward the other detector or detectors, in order to avoid any undesired interaction between said targets and said detectors.

In addition, the detector and/or the target can be of the Hall effect, Foucault current, PLCD, or flux gate type.

The invention also relates to a double clutch equipped with a release bearing of the aforementioned type.

BRIEF DESCRIPTION OF THE DRAWINGS

The invention will be better understood, and other details, characteristics, and advantages of the invention will emerge, upon reading the description below provided as a non-limiting example with reference to the attached drawings, in which:

FIGS. 1 and 2 depict a double clutch 1 of the existing art, known from the Applicant's document FR 2 803 346.

DETAILED DESCRIPTION OF THE PREFERRED EMBODIMENT(S)

Figure 1:
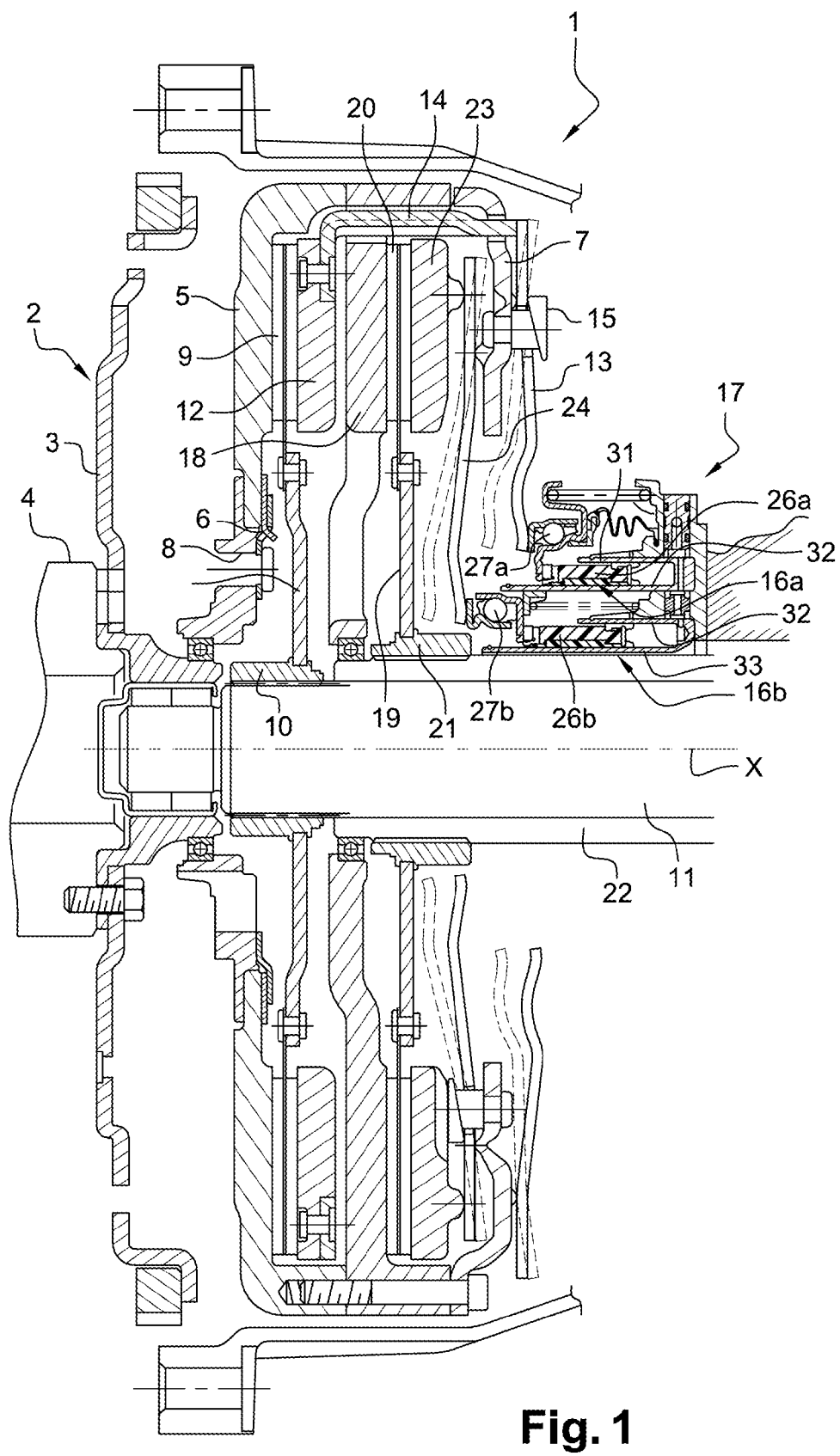
FIG. 1 is a partial, axially sectioned view of a double clutch of the existing art.

A clutch has a dual mass flywheel 2, only part of which has been depicted, comprising a primary flywheel 3 integral with a driving shaft, for example a crankshaft 4 of an internal combustion engine of a motor vehicle, and a secondary flywheel 5 equipped with a torque limiter 6, and means (not depicted) for damping and absorbing vibration and rotational irregularities, which are arranged between primary flywheel 3 and secondary flywheel 5.

Secondary flywheel 5 constitutes a reaction plate of a first clutch mechanism, and is fastened to a recessed cover 7.

The first clutch mechanism comprises a first friction disk 8 carrying friction linings 9 and having a splined hub 10 rotationally coupled to a first input shaft 11, associated with the odd-numbered gear ratios, of a gearbox, and a first pressure plate 12 movable in translation along axis X of hub 10 and of crankshaft 4. First pressure plate 12 is movable between an engaged position in which first friction disk 8 is clamped between first pressure plate 12 and first reaction plate 5 in order to transmit a torque from crankshaft 4 to shaft 11, and a disengaged position in which first friction disk 8 is released. The displacement of first pressure plate 12 is actuated by means of a first diaphragm 13 and a connecting member constituted by a movable cover 14. First diaphragm 13 is mounted tiltingly on cover 7 by means of rivets 15 that ensure centering of said diaphragm 13 while allowing it to tilt. First diaphragm 13 takes the form of an elastic annular metal sheet that abuts against cover 7 and tilts around said abutment region.

First clutch 7 is controlled by means of a first actuator 16a of a release bearing 17, interacting with the radially inner periphery of first diaphragm 13. First diaphragm 13 constitutes a lever transmitting the force applied by first actuator 16a to first pressure plate 8 by means of movable cover 14.

The first clutch mechanism is of the normally open type. The inactive position of first diaphragm 13 thus corresponds to a disengaged state of the first clutch mechanism. First diaphragm 13 preferably exhibits a portion of the Belleville disc type, allowing first diaphragm 13 to be returned toward its inactive position.

With first diaphragm 13 in the inactive position, i.e. when first actuator 16a is exerting little or no force on first diaphragm 13, first diaphragm 13 thus exerts little or no force on first pressure plate 12. First pressure plate 12 is moved away from first reaction plate 5 via appropriate return means, such as elastic tongues, in order to release first friction disk 8.

The double clutch furthermore has a second clutch mechanism having: a second reaction plate 18, the radially outer periphery of which is rotationally coupled to first reaction plate 5 and/or to cover 7; a second friction disk 19 carrying friction linings 20 and having a splined hub 21 rotationally coupled to a second input shaft 22, associated with even-numbered gear ratios, of a gearbox; and a second pressure plate 23 movable in translation along axis X of hub 21. Second pressure plate 23 is movable between an engaged position in which second friction disk 19 is clamped between second pressure plate 23 and second reaction plate 18 in order to transmit a torque from crankshaft 4 to shaft 22, and a disengaged position in which second friction disk 19 is released. The displacement of second pressure plate 23 is actuated by means of a second diaphragm 24. The latter is mounted tiltingly on cover 7 by means of rivets 15 and takes the form of an elastic annular metal sheet that abuts against cover 7 and tilts around said abutment region.

The second clutch mechanism is controlled by means of a second actuator 16b of release bearing 17, interacting with the radially inner periphery of second diaphragm 24. Second diaphragm 24 constitutes a lever transmitting the force applied by second actuator 16b to second pressure plate 23.

The second clutch mechanism is likewise of the normally open type. The inactive position of second diaphragm 24 thus corresponds to a disengaged state of the second clutch mechanism. Second diaphragm 24 preferably exhibits a portion of the Belleville disc type, allowing second diaphragm 24 to be returned toward its inactive position.

With second diaphragm 24 in the inactive position, i.e. when second actuator 16b is exerting little or no force on second diaphragm 24, second diaphragm 24 thus exerts little or no force on second pressure plate 23. Second pressure plate 23 is moved away from second reaction plate 18 via appropriate return means, such as elastic tongues, in order to release second friction disk 19.

Figure 2:
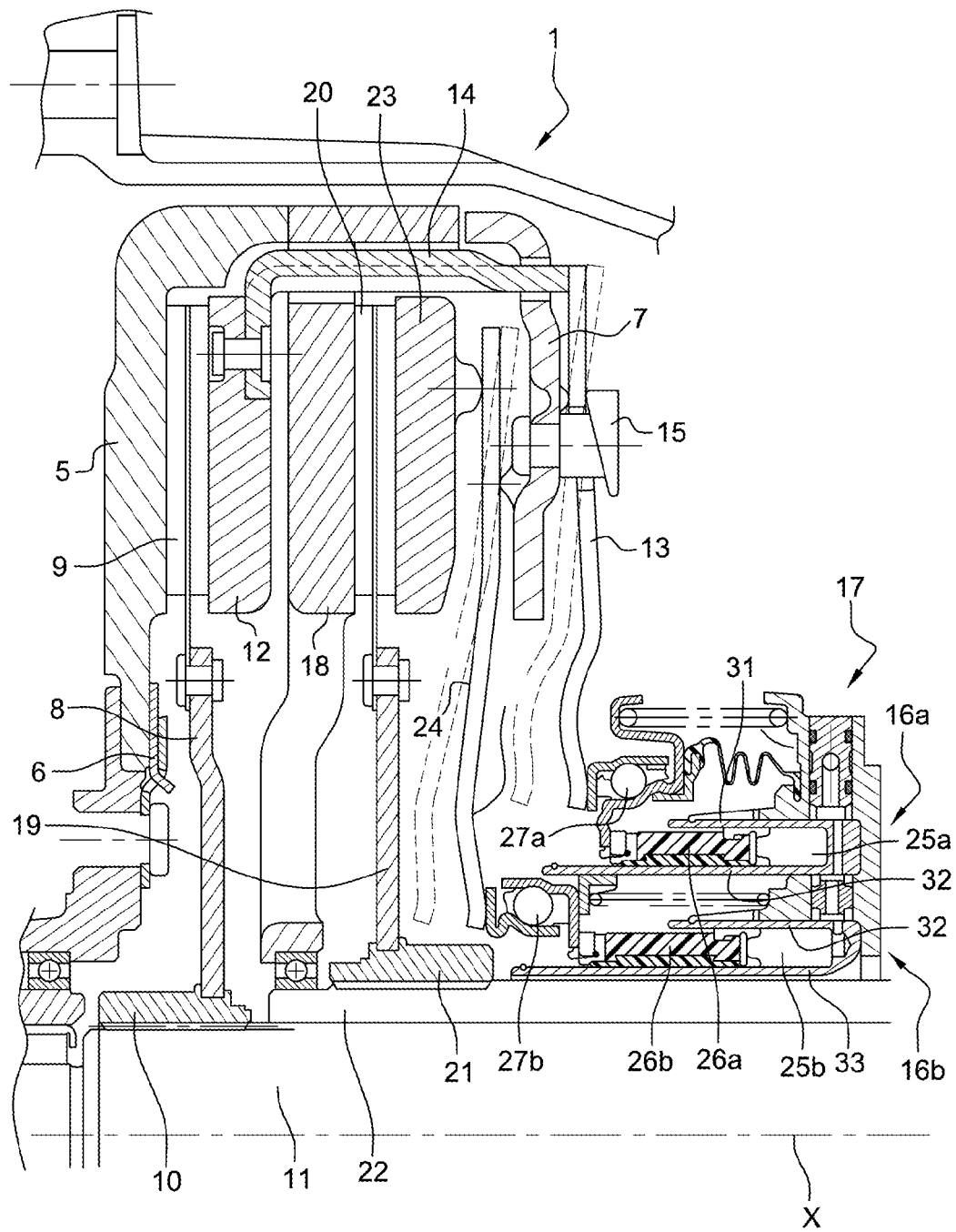
FIG. 2 is a sectioned half-view of a part of the double clutch of FIG. 1.

As is more evident from FIG. 2, release bearing 17 has two concentric annular receptacles 25a, 25b, having an axis X, in which are mounted pistons 26a, 26b belonging to the aforesaid actuators 16a, 16b. A first, radially outer annular piston 26a is intended to actuate first diaphragm 13 by means of a first ball bearing 27a. A second, radially inner annular piston 26b is intended to operate second diaphragm 24 by means of a second ball bearing 27b. Pistons 26a, 26b are movable in translation along axis X, and their displacement is controlled hydraulically by means of pressurized fluid supply conduits. Actuators 16a, 16b of this type are called concentric slave cylinders (CSC).

For precise control of the operation of the first and second clutch mechanisms, it is necessary to known the positions of first and second diaphragms 13, 24 and thus of first and second pistons 26a, 26b. This type of information in particular enables identification of any change in the biting point of each clutch mechanism, for correction purposes. It is known that the biting point is that position of the diaphragm or of the piston at which a torque begins to be transmitted through the clutch mechanism in question.

Information regarding the positions of the first and second pistons makes it possible to:

precisely regulate the transmission of torque in each of the clutches;

establish diagnostics as necessary;

evaluate wear of the friction linings;

detect any operating defect in the system, for example a blockage.

For this purpose, the invention proposes to equip the first and second actuators 16a, 16b with noncontact position sensors.

More particularly, first and second pistons 16a, 16b are equipped respectively with a first target 28a and a second target 28b interacting respectively with a first detector 29a and a second detector 29b each capable of detecting the position, along axis X, of the corresponding target 28a, 28b.

An electronic system for processing the signal emitted by detector 29a, 29b is associated with each detector 29a, 29b. The electronic processing system supplies an output signal providing a datum regarding the relative position of target 28a, 28b with respect to detector 29a, 29b. The target and the detector constitute a noncontact position sensor. A sensor of this kind can be, for example, of the Hall effect, Foucault current, permanent magnetic linear contactless displacement (PLCD), or flux gate type.

Figure 3:
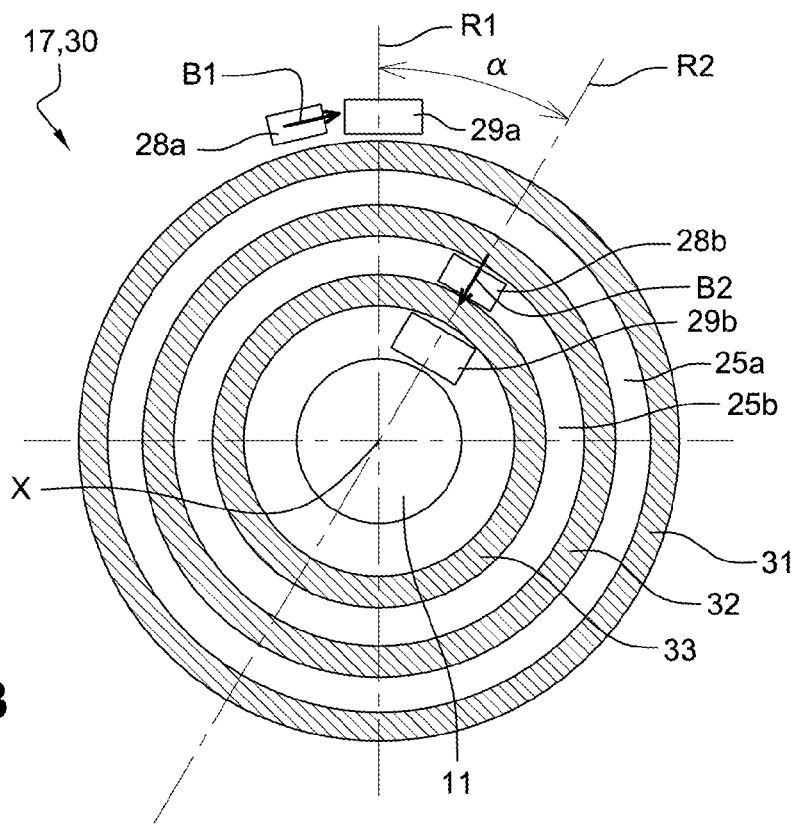
FIGS. 3 to 6 are schematic views, sectioned along a radial plane, of a release bearing for operation of a double clutch, according to four embodiments of the invention.

In a first embodiment illustrated in FIG. 3, release bearing 17 has a tubular body 30 comprising three concentric annular walls 31, 32, 33 delimiting between them two concentric annular spaces 25a, 25b into which pistons 26a, 26b of actuators 16a, 16b are engaged. These walls have also been labeled with the same references in FIGS. 1 and 2 that illustrate the existing art. The first, radially outer piston 26a is engaged into space 25a delimited between annular walls 31 and 32, and the second, radially inner piston 26b is engaged into space 25b delimited between annular walls 32 and 33.

In this embodiment, first target 28a is offset angularly, with respect to axis X, from first detector 29a and is located radially facing toward, or on the same circumference as, first detector 29a. First detector 29a and first target 28a are both located radially outside of annular wall 31. For this, first target 28a extends, for example, radially outward from first piston 26a.

Second target 28b is located radially in the same plane as second detector 29b. More particularly, second target 28b is located radially between annular walls 32 and 33, and second detector 29b is located radially inside of wall 33.

Radial plane R2 passing through second target 28b and second detector 29b is offset angularly (by an angle α) from radial plane R1 passing through first detector 29a. In addition, first target 28a is offset angularly from first detector 29a on the other side of radial plane R2.

Figure 4:
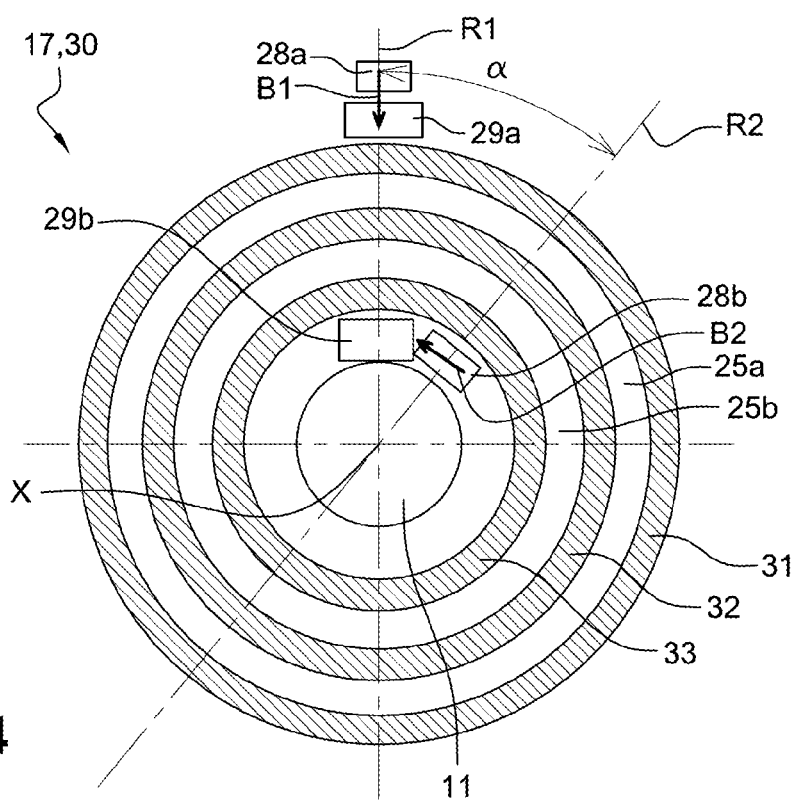

FIG. 4 illustrates a second embodiment of the invention in which first target 28a is located radially in the same plane R1 as first detector 29a. More particularly, first target 28a is located radially outside of first detector 29a, which in turn is located radially outside of wall 31. For this, first target 28a extends, for example, radially outward from first piston 26a.

In addition, second target 28b is offset angularly, with respect to axis X, from second detector 29b and is located radially facing toward, or on the same circumference as, second detector 29b. Second detector 29b and second target 28b are both located radially inside of annular wall 33. For this, second target 28b extends, for example, radially inward from second piston 26b. In this embodiment, first detector 29a and second detector 29b are located in a single radial plane R1.

Figure 5:
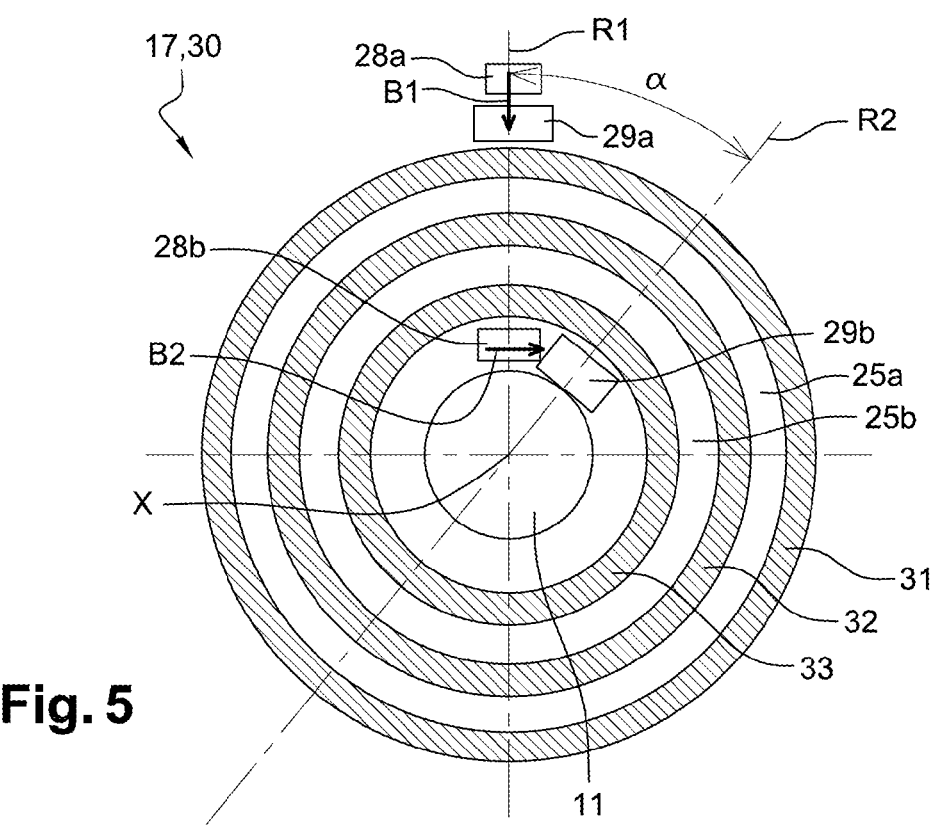

FIG. 5 illustrates a third embodiment of the invention in which first target 28a is located radially in the same plane R1 as first detector 29a. More particularly, first target 28a is located radially outside of first detector 29a, which in turn is located radially outside of wall 31. For this, first target 28a extends, for example, radially outward from first piston 26a.

In addition, second target 28b is offset angularly, with respect to axis X, from second detector 29b and is located radially facing toward, or on the same circumference as, second detector 29b. Second detector 29b and second target 28b are both located radially inside of annular wall 33. For this, second target 28b extends, for example, radially inward from second piston 26b. In this embodiment, second detector 29b is offset angularly from first detector 29a, second target 28b being located, for example, in the same radial plane R1 as first detector 29a and first target 28a.

Figure 6:
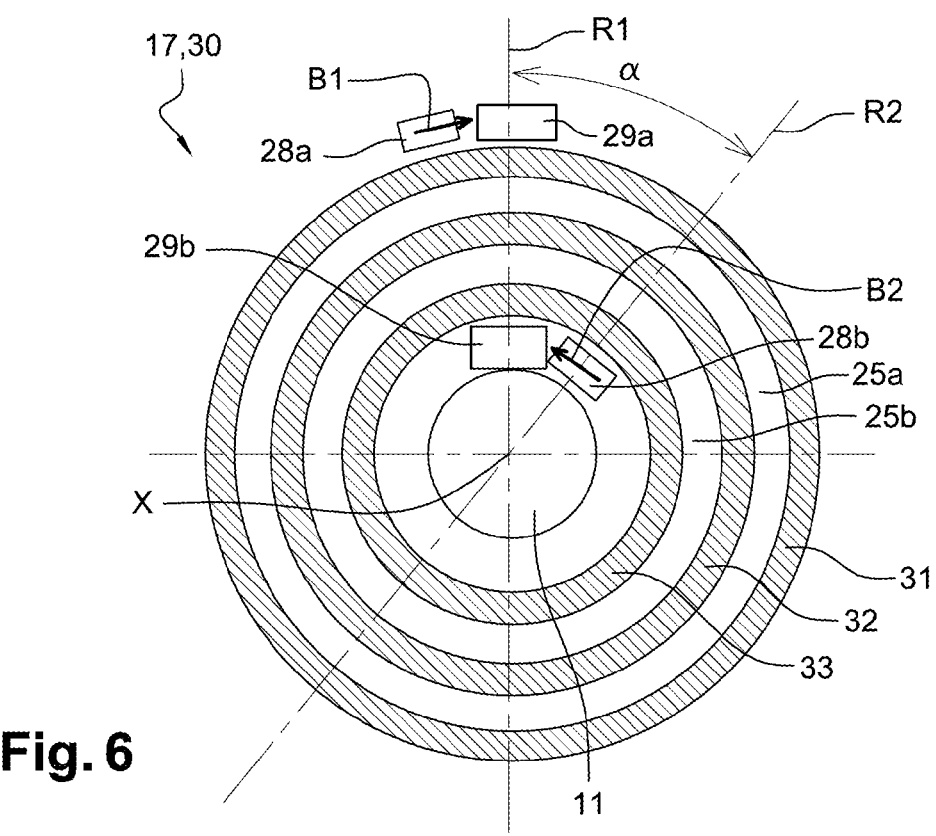

FIG. 6 illustrates a fourth embodiment of the invention in which first target 28a is offset angularly, with respect to axis X, from first detector 29a and is located radially facing toward, or on the same circumference as, first detector 29a. First detector 29a and first target 28a are both located radially outside of annular wall 31. For this, first target 28a extends, for example, radially outward from first piston 29a.

In addition, second target 28b is offset angularly, with respect to axis X, from second detector 29b and is located radially facing toward, or on the same circumference as, second detector 29b. Second detector 29b and second target 28b are both located radially inside of annular wall 33. For this, second target 28b extends, for example, radially inward from second piston 26b. In this embodiment, first detector 29a and second detector 29b are located in a single radial plane R1, first and second targets 28a, 28b being offset angularly oppositely from one another with respect to radial plane R1.

In each of the aforementioned embodiments, the magnetic field emitted by each target 28a, 28b is directed toward the corresponding detector 29a, 29b. In the case of the embodiments of FIGS. 3, 4, and 5, for example, the magnetic field of first target 28a, labeled B1, is thus perpendicular to the magnetic field of second target 28b, labeled B2.

In general, it is useful to ensure that magnetic field B1 is not directed toward second detector 29b and that magnetic field B2 is not directed toward first detector 29a, which is the case for each of the aforementioned embodiments. It is thereby possible to prevent magnetic field B1 of first target 28a from being detected by second detector 29b, or from disrupting measurement of the position of second target 28b by second detector 29b, and to prevent magnetic field B2 of the second target from being detected by first detector 29a, or from disrupting measurement of the position of first target 28a by first detector 29a.

These various embodiments of the invention allow the radial and/or axial space requirement of release bearing 17 to be reduced using conventional, inexpensive, and proven sensors, while avoiding possible interference among the sensors.

The invention claimed is:

1. A clutch release bearing (17), in particular for a motor vehicle, having:
a tubular body (30) through which at least one input shaft (11, 22) of a gearbox is intended to pass; at least one actuator (16a, 16b) having a movable part (26a, 26b), movable in translation along the axis (X) of the body (30), intended for actuation of a clutch diaphragm (13, 24); a target (28a, 28b), having a magnetic field (B1, B2), whose position is representative of the position of the movable part (26a, 26b) of the actuator (16a, 16b); and a detector (29a, 29b) capable of detecting the position of the target (28a, 28b), wherein the target (28a, 28b) is offset angularly from the detector (29a, 29b) with respect to the axis (X) of the body (30) wherein, said magnetic field (B1, B2) of said target (28a, 28b) is directed toward the detector (29a, 29b).

2. The clutch release bearing (17) according to claim 1, wherein the target (28a, 28b) is located, at least in part, radially facing toward the detector (29a, 29b) or on the same circumference as the detector (29a, 29b).

3. The clutch release bearing (17) according to claim 2, wherein said at least one actuator comprises a pair of actuators, including a first actuator (16a) and a second actuator (16b) located radially inside of the first actuator (16a), each actuator (16a, 16b) having an associated movable part (26a, 26b), an associated target (28a, 28b) whose position is representative of the position of the associated movable part (26a, 26b) of the first or second actuator (16a, 16b), and an associated detector (29a, 29b) capable of detecting the position of said target (28a, 28b) associated with said first or second actuator, at least one of said targets (28a, 28b) being offset angularly with respect to the associated detector (29a, 29b) and being located, at least in part, radially facing toward said associated detector (29a, 29b) or on the same circumference as said associated detector (29a, 29b).

4. The clutch release bearing (17) according to claim 2, wherein the detector (29a, 29b) and/or the target (28a, 28b) are of the Hall effect, Foucault current, PLCD, or flux gate type.

5. The clutch release bearing (17) according to claim 1, wherein said at least one actuator comprises a pair of actuators, including a first actuator (16a) and a second actuator (16b) located radially inside of the first actuator (16a), each actuator (16a, 16b) having an associated movable part (26a, 26b), an associated target (28a, 28b) whose position is representative of the position of the associated movable part (26a, 26b) of the first or second actuator (16a, 16b), and an associated detector (29a, 29b) capable of detecting the position of said target (28a, 28b) associated with said first or second actuator, at least one of said targets (28a, 28b) being offset angularly with respect to the associated detector (29a, 29b) and being located, at least in part, radially facing toward said associated detector (29a, 29b) or on the same circumference as said associated detector (29a, 29b).

6. The clutch release bearing (17) according to claim 5, wherein the detectors (29a, 29b) of the first and second actuators (16a, 16b) are offset angularly from one another with respect to the axis (X) of the tubular body (30).

7. The clutch release bearing (17) according to claim 6, wherein the detector (29a, 29b) and/or the target (28a, 28b) are of the Hall effect, Foucault current, PLCD, or flux gate type.

8. A double clutch (1), wherein it has a clutch release bearing (17) according to claim 6.

9. The clutch release bearing (17) according to claim 5, wherein the detectors (29a, 29b) of the first and second actuators (16a, 16b) are located in a single radial plane (R1), the associated targets (28a, 28b) of the first and second actuators (16a, 16b) being offset angularly from one another with respect to the axis (X) of the tubular body (30).

10. The clutch release bearing (17) according to claim 9, wherein the detector (29a, 29b) and/or the target (28a, 28b) are of the Hall effect, Foucault current, PLCD, or flux gate type.

11. A double clutch (1), wherein it has a clutch release bearing (17) according to claim 9.

12. A double clutch (1), wherein it has a clutch release bearing (17) according to claim 5.

13. The clutch release bearing (17) according to claim 5, wherein the detector (29a, 29b) and/or the target (28a, 28b) are of the Hall effect, Foucault current, PLCD, or flux gate type.

14. The clutch release bearing (17) according to claim 1, wherein the detector (29a, 29b) and/or the target (28a, 28b) are of the Hall effect, Foucault current, PLCD, or flux gate type.

15. A double clutch (1), wherein it has a clutch release bearing (17) according to claim 14.

* * * * *